United States Patent [19]
Williamson

[11] 3,852,494
[45] Dec. 3, 1974

[54] METHODS AND APPARATUS FOR DECORATING CONFECTIONERY ITEMS

[76] Inventor: Elmer V. Williamson, 7729 Dones Ave., Cincinnati, Ohio 45243

[22] Filed: Apr. 30, 1973

[21] Appl. No.: 355,515

[52] U.S. Cl.................. 426/383, 426/104, 426/496
[51] Int. Cl............................................. A21d 13/08
[58] Field of Search .......... 426/383, 162, 496, 512, 426/104, 249, 250

[56] References Cited
UNITED STATES PATENTS

| | | | |
|---|---|---|---|
| 1,546,000 | 7/1925 | Bausman............................ | 426/383 |
| 1,788,493 | 1/1931 | Olschewsky ....................... | 426/512 |
| 2,353,594 | 7/1944 | Seagren ............................. | 426/104 |
| 2,610,588 | 9/1952 | Seagren et al. .................... | 426/104 |

FOREIGN PATENTS OR APPLICATIONS

| | | | |
|---|---|---|---|
| 161,740 | 4/1921 | Great Britain...................... | 426/383 |

Primary Examiner—Robert L. Lindsay, Jr.
Attorney, Agent, or Firm—Wood, Herron & Evans

[57] ABSTRACT

A method of decorating a confectionery item includes the steps of applying a lining material to a design stamp, applying and removing the stamp from a surface of the confectionery item thereby leaving a delineated design on the surface, and thereafter applying a fill material to color, decorate and complete the design. A stamp for performing the method includes integral elongated members being triangular in cross-section and terminating downwardly at elongated apices delineating the design provided by the stamp. An alternate stamp includes an integral supporting web from which the elongated members depend. A handle for grasping and supporting either stamp is located in a position offset from a central portion of the stamp.

7 Claims, 8 Drawing Figures

PATENTED DEC 3 1974 3,852,494

METHODS AND APPARATUS FOR DECORATING CONFECTIONERY ITEMS

This invention relates to methods and apparatus for decorating confectionery items and more particularly to methods and apparatus for applying designs and decorations to confectionery items such as cakes, cookies and the like.

It has been known in the art of confectionery making to apply various types of decorations to the confectionery in order to enhance its appearance. Such decorations have in the past included decorative artificial members which are placed on the confectionery as well as colorful designs comprising in themselves edible colored material placed directly on the confectionery.

When it is desired to place an edible decorative design directly on the confectionery, the decorator must either rely on his own artistic ability or must resort to some device for aid in placing the design on the confectionery. One such device known as a KOPYKAKE is operable to project an optical image onto a cake so that a decorator can apply a decoration to the cake, utilizing the projected image as a guide. Another such device comprises a decorating stamp such as that described in my previous U.S. Pat. No. 3,446,143. That apparatus includes a stamp having individual sections movable with respect to one another. Various materials of disparate colors are applied to different sections of the stamp and then the sections are held in registry such that the sections form a composite unit capable of impressing the multiple colors upon the confectionery to render a complete design.

Such devices, while suitable for their respective functions, have several inherent disadvantages. For example, the KOPYKAKE device is relatively expensive, when compared to the more economical hand stamp such as that disclosed in my previous patent.

Hand stamps such as mentioned above are relatively inflexible in that they are commonly used to apply a fixed complete colored design. In a multiple color operation, such stamps require manipulation of their various sections during the application of coloring material thereto.

It has therefore been one object of my invention to provide an economical method and apparatus for decorating confectionery items such as cakes, cookies and the like.

A further object of my invention has been to provide a method and apparatus for applying predetermined delineated designs to confectionery items in order to provide a design outline which can be colorfully decorated.

A further object of my invention has been to provide a method and apparatus for applying a decoration to either the iced or uniced surfaces of a confectionery item.

A yet further object of my invention has been to provide a method and apparatus for applying a decoration to a plurality of confectionery items either prior to or after the cooking thereof.

The method and apparatus provided by my invention enables either a skilled or unskilled decorator to very easily and simply apply the outline of a predetermined design to the iced or uniced surface of a confectionery item such as a cake or a cookie. Once the design has been delineated on the confectionery, the design may be completed by the application of colored, edible fill material such as decorating gels, icing and the like.

The preferred method specifically includes the application of an edible colored lining material to a stamp which has portions defining a predetermined design. After the colored lining material has been applied to the stamp, the stamp is impressed into the surface of the confectionery and is then removed, leaving at least a delineated outline of a predetermined design. When the stamp has been removed, the decorator fills in the outline with various fill materials. Such fill materials may be transparent or translucent so the lines of the design which were applied by the stamp can be seen therethrough.

A plurality of items can be impressed with a delineated design merely by providing a stamping apparatus with a plurality of separate design portions or elements. The apparatus can then be registered with a plurality of confectionery items so that each design portion of the stamping apparatus is impressed into a separate confectionery item and thereby the design is simultaneously applied to a number of confectionery items. This latter method is particularly useful in applying the design outline to a plurality of baked or unbaked cookies or the like.

In a preferred single stamping apparatus, the stamp itself includes integral elongated members having a triangular or other narrow edged cross-section, the members generally defining a predetermined design. The triangular shape of the elongated members terminates downwardly in an elongated apex or line which defines the precise predetermined design to be transferred.

In use, a colored lining material is applied to the stamping apparatus and, when the apparatus is impressed against the surface of the confectionery, the lining material on the elongated apex of the triangular stamping members is transferred onto the surface of the confectionery.

In order to facilitate handling of the stamp during operation therof and to provide visibility of the design being applied to the confectionery item, the stamp is provided with a supporting means or handle located in a position offset from the central portion of the stamp. In this manner, the operator may principally support the stamp by the offset handle and press the remainder of the stamp into the surface of the confectionery item in a very simple manner without having to maneuver the stamp or his grasp of it.

It can be readily appreciated that my invention provides a highly economical and simplified method and apparatus for applying a design to the surface of a confectionery item. Further, the method and apparatus provided by my invention is a highly flexible one due to the fact that the stamp only provides a delineated design on the surface of the confectionery thereby allowing different colors to be utilized in the completion of each design. For example, where the stamp is used more than once on the same confectionery item, the different designs can be completed with a variety of different colors without halting the operation in order to clean or replace portions of the stamp. It can also be appreciated that the stamps can be used to provide a complete design in themselves. For example, the stamp may be constructed so as to delineate an appropriate written phrase on the confectionery.

These and other objects and advantages will become readily apparent to one of ordinary skill in the art from the following detailed description of a preferred embodiment and from the drawings in which.

Figure 2:
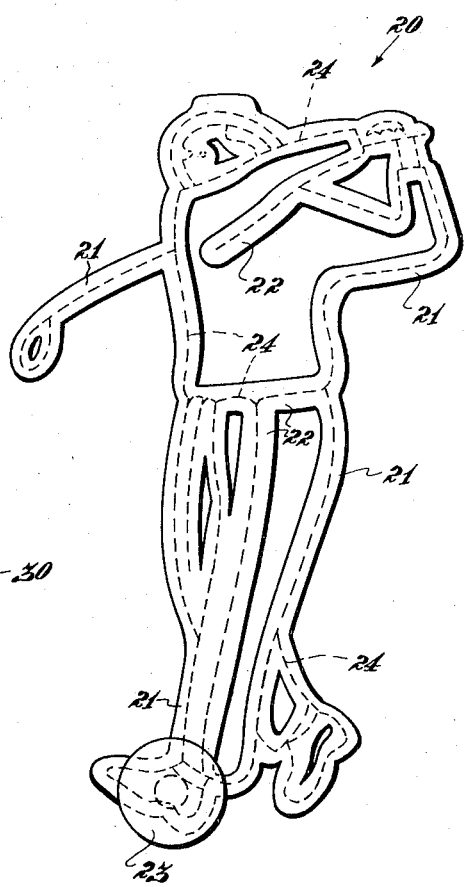
FIG. 2 is a top view of the particular stamp utilized in part to provide the completed decoration as shown in FIG. 1.
Figure 3:
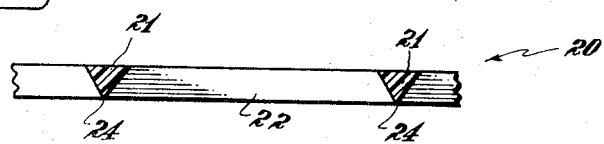
FIG. 3 is an exemplary cross-sectional view of FIG. 2.

Referring now particularly to the drawings, a preferred stamp apparatus itself will first be described. In FIGS. 2 and 3, a stamp apparatus is shown at 20. The apparatus includes integral, elongated members identified, for example, by the numbers 21. The unitary stamp can be formed by a suitable process, such as molding, and of any suitable material such as plastic. The elongated members are constructed to form and define a predetermined design. In this particular instance, the elongated members have been formed in order to define the design of a golfer. The elongated members form not only the mere outline of the golfer's shape but are also positioned inwardly of the golfer's outline in order to lend greater definition and realism to the design. Such inward elongated members are, for example, identified by the numeral 22.

A stamp apparatus supporting means such as a handle 23 is provided in a position which is offset with respect to a central portion of the stamping apparatus. In FIG. 2, handle 23 is positioned at the very lower extremity of the stamp apparatus. The positioning of the handle 23 at an offset position with respect to the central area of the stamping apparatus has several advantages. In use, the stamping apparatus is grasped by the handle 23 to greatly facilitate the handling of the apparatus, and to provide a greater visiblity of the apparatus during its use. It is unnecessary for an operator to maneuver the stamp or change his grip on it when pressing the edge of the stamp into the confectionery item.

A cross-sectional view of the stamping apparatus is shown in FIG. 3 and illustrates the particular configuration of the elongated members defining the design of the stamping apparatus. In FIG. 3, it can be seen that each of the elongated members has a general triangular cross-section which terminates downwardly at an apex 24. Since the members 21 are elongated, the apex 24 is similarly elongated and particularly forms the lines which define the design provided by the stamp apparatus. These elongated apices are seen in dotted form in FIG. 2.

Figure 3A:
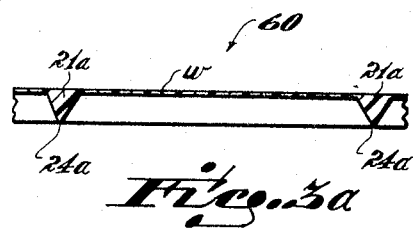
FIG. 3a is a cross-sectional view similar to FIG. 3 and shows an alternate embodiment of the stamp.

In an alternate embodiment (see FIG. 3a), a stamp apparatus 60 is provided with a strengthening web W and generally comprises a flat plate or web W from which depend design defining members 21a. The stamp 60 can be formed by any suitable process and from any suitable material into a preferably integral or unitary stamp. The members 21a are elongated and are formed with a triangular cross-section, terminating downwardly in elongated apices 24a which delineate the design. The web W serves to strengthen the stamp 60, giving it rigidity and rendering it less likely to break.

WHile the stamp apparatus of either embodiment can be constructed to define any form of ornamental design, the stamp also can be made to delineate an appropriate written letter, term, phrase, or the like to be applied to a confectionery.

Figure 1:
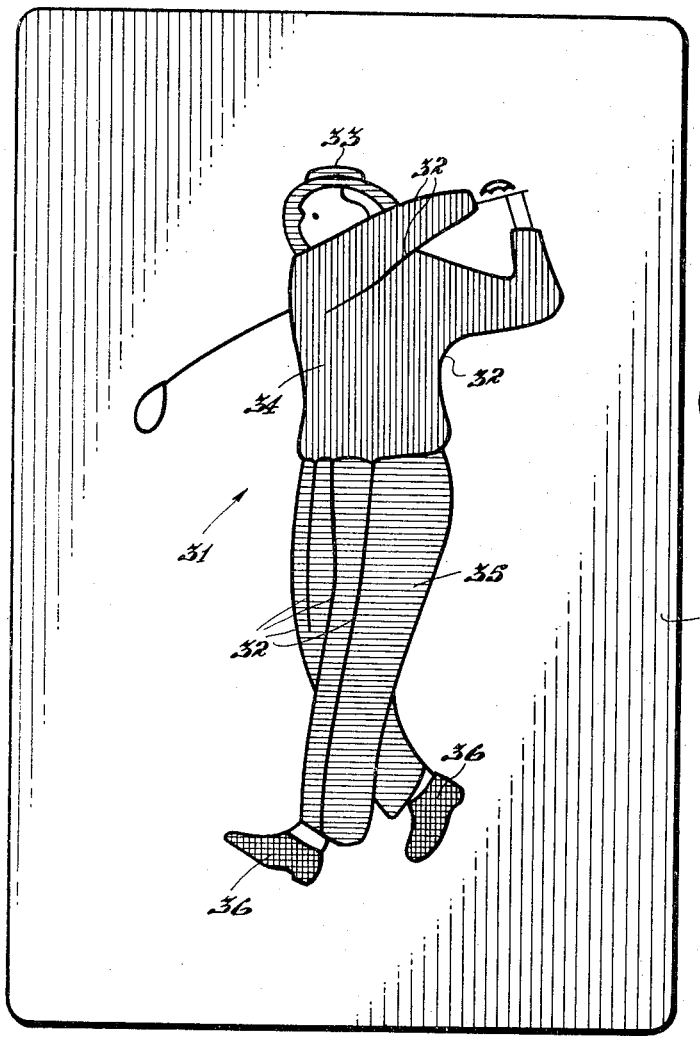
FIG. 1 shows a confectionery item bearing a complete design provided according to the invention.

Turning now to the description of the method by which the completed design is applied to a confectionery item such as a cake or cookie, FIG. 1 of the drawing depicts a cake 30 to which a completed golfer design 31 has been applied. The design itself comprises design lines 32 which in totality delineate a complete design including both outer and inner definition lines. All of the design lines 32 themselves comprise some form of edible colored lining material which, as used herein, means an edible vegetable dye or equivalent. For example, colored material such as that marketed by the Chef Master Company and known as LIQUID COLOR or PASTE COLOR has been found to be suitable.

The completed golfer design 31 also includes colored portions 33, 34, 35 and 36 and the drawings have been lined to show that a variety of colors have been applied to complete the design. For instance, the golfer's hat 33 and his trousers 35 have been lined for the color blue. His sweater 34 has been lined for the color red and his shoes 36 have been lined for the color black. The colored portion of the design may, for example, be formed of an edible colored fill material such as a transparent or translucent piping gel or the like which has been tinted to a desired color. Also, watered food coloring, tinted icing or any other suitable material can be utilized, whether transparent, translucent, or opaque. The tinted piping gel used in the preferred embodiment is translucent or transparent so that the lines 32 and particularly the inward definition lines may be seen through the gel.

A preferred method contemplated by my invention for providing the completed design as shown in FIG. 1 generally includes the steps of (1) applying an edible colored lining material to the stamp apparatus as shown in FIG. 2, (2) applying the stamp apparatus to the surface of a confectionery item, such as the cake 30, in order to transfer the colored lining material on the elongated members 21 of the stamp apparatus onto the surface of the cake 30, (3) removing the stamp apparatus thereby leaving the transferred design lines 32 on the surface of the cake 30, and (4) thereafter applying colored fill materials in order to decorate the design.

Figure 4:
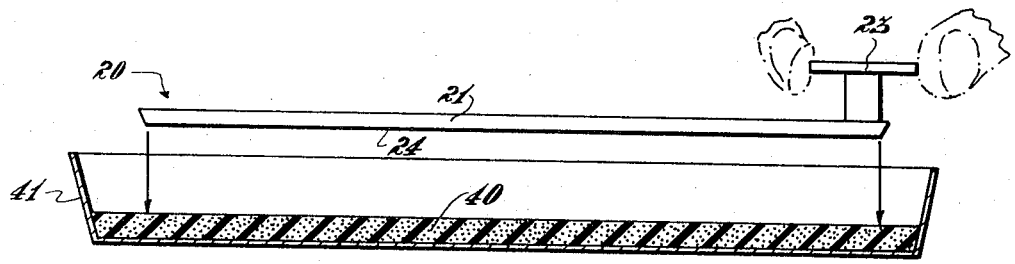
FIG. 4 is a view showing the application of coloring material to the stamp.

FIG. 4 diagrammatically illustrates the application of the lining material to the stamping apparatus. In the preferred embodiment, a sponge member 40 is placed within a pan 41 and is thereafter impregnated with the colored lining material in a moist or liquid form. Since this material will eventually form the definition lines of the design, it has been found suitable to utilize a black color, although other colors, of course, could be utilized.

The stamp apparatus 20 is grasped by the handle 23 and is moved downwardly and then pressed into the sponge so that an amount of colored lining material is tranferred to the elongated members 21, 22 of the stamp apparatus. The stamp apparatus 20 is then removed from the pan 41 into position over a confectionery item such as the cake 30.

Figure 5:
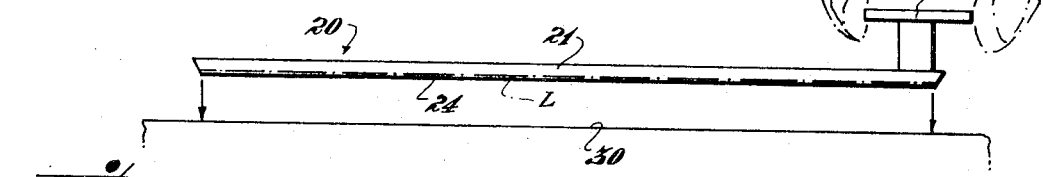
FIG. 5 is a view showing the application of the stamp to the confectionery item in order to transfer a design outline thereto.

FIG. 5 illustrates the application of the stamp apparatus 20 to the cake 30. The stamp now has lining material thereon as indicated by the phantom line L. In this step, the stamp apparatus is also grasped by the handle 23 and is impressed into the surface of the cake 30. During impression, the stamp is held by handle 23 and an operator pushes the stamp into the confectionery. To facilitate complete transfer, the operator may press portions of the stamp, distant from the handle, into the confectionery.

Figure 6:
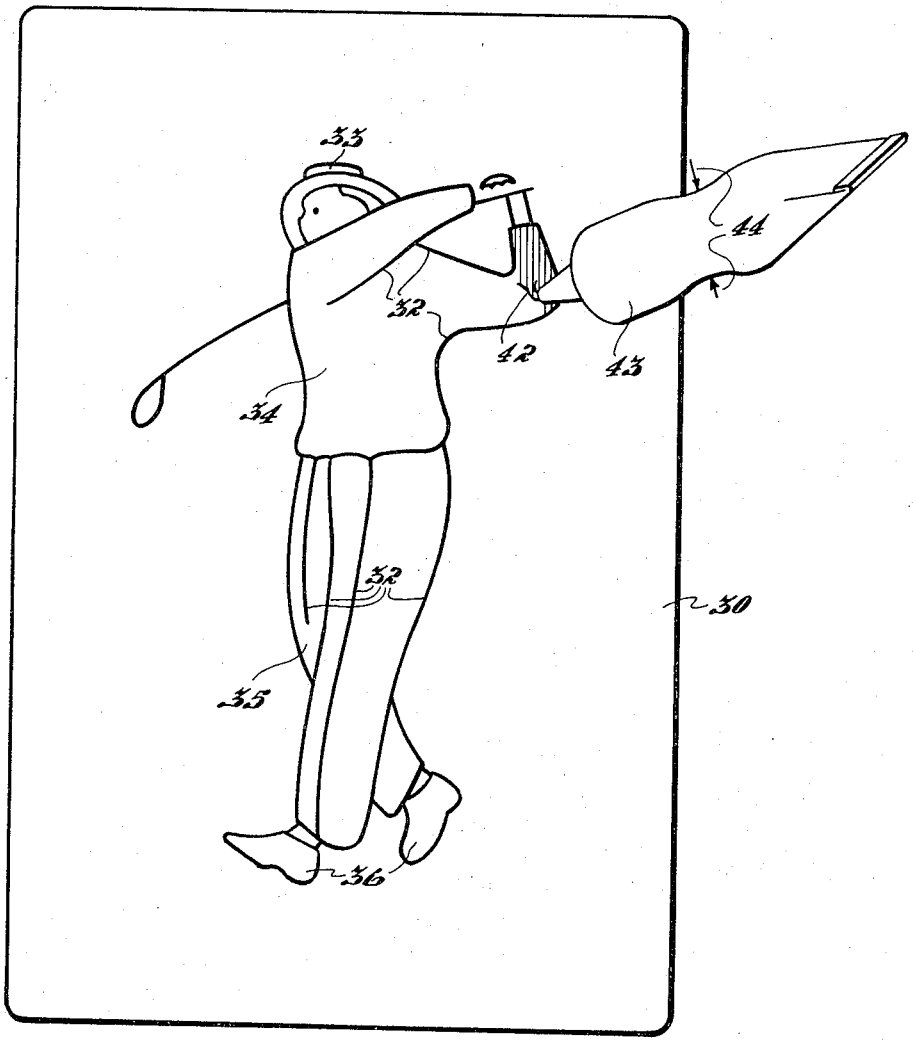
FIG. 6 is a top view of a confectionery item to which a design outline has been applied and to which the coloring of the design has just begun.

Stamp 20 is then removed from the cake and, as shown in FIG. 6, the design defining lines (some of which are identified by the numeral 32) are left in the surface of the cake. Since the elongated members 21, 22 are of triangular cross-section terminating downwardly in an elongated apex 24, it can be appreciated that it is possible to leave a very thin design line 32 on the surface of the cake 30. Of course, if the stamp apparatus is impressed further into the surface of the cake, the design lines 32 will be correspondingly wider. It will also be appreciated that it is possible to transfer the lines 32 onto the surface of the cake whether or not the surface is iced.

The liquidity of the colored material acts as a form of lubricant to minimize sticking of the confectionery to the stamp. This enables the design to be easily applied to both the iced and uniced surfaces of confectionery items.

Once the stamp apparatus 20 has been removed from the surface of the cake 30, the design can be completed by filling it in with colored fill material. A first part of this step is diagrammatically shown in FIG. 6 wherein a tinted transparent gel such as shown at 42 is being ejected from a flexible tube 43 by the application of force on the tube as at 44. Of course, any suitable mechanism may be utilized for applying the fill material or gel 42 to the design on the confectionery item. A number of different tubes of fill material can be used so that a variety of fill colors may be conveniently used to complete the design. Where the stamp delineates a written letter, term, phrase, or the like, the delineated design on the confectionery may be further decorated with fill material or may simply be left alone as complete.

In the preferred method heretofore described, it will be understood that the design has been applied to the surface of the confectionery item after the confectionery item has been cooked or baked (as in the case with cookies or cakes). It is possible, however, to apply the design outline of lining material and even the colored fill material to a confectionery item prior to the time when it is baked. For example, it is possible to apply the design outline or in some cases even the complete design to the dough-like surface of a cookie prior to the time when it is baked. The design will be readily apparent upon completion of the baking operation.

Figure 7:
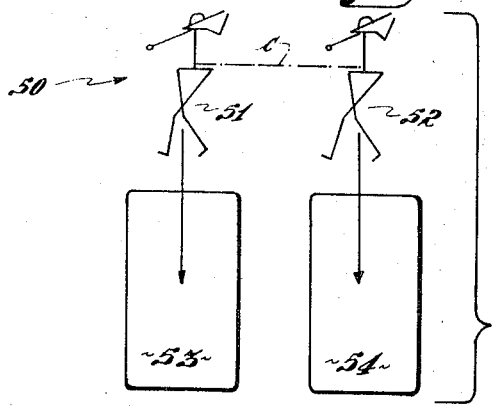
FIG. 7 is a diagrammatic view showing a stamp having a plurality of different design portions adapted for simultaneously applying the design to a plurality of confectionery items.

It is to be additionally understood that this invention contemplates the simultaneous application of a number of designs onto a plurality of confectionery items. FIG. 7 is a diagrammatic view of such an operation. In this figure, a stamp apparatus 50 comprises a number of separate and independent design stamps 51 and 52. Each of the separate stamps 51 and 52 may comprise similar or different designs. Regardless of this feature, however, separate stamps 51 and 52 are connected by some connecting means such as indicated diagrammatically by the broken line designated by the letter C in the figure. With the exception that a plurality of stamps are utilized to simultaneously apply a design outline onto a plurality of confectionery items, the method depicted in FIG. 7 is the same as that heretofore described. The stamp apparatus 50 is impressed into a sponge-like member impregnated with a colored lining material and the separate stamps 51 and 52 pick up an amount of this material. The stamp apparatus 50 is then lowered into a position so that the stamping members 51 and 52 respectively engage confectionery items 53 and 54.

Of course, the method provided for by this operation is not limited to merely two stamps which are connected but contemplates the utilization of a stamping apparatus having a plurality of separate spaced stamping members in order to transfer the design, which each member defines, simultaneously onto a plurality of different confectionery items. In this manner, a design may be very easily placed onto a number of cookies residing, for example, in a corresponding spaced relationship on a tray. The method thus eliminates the need to separately apply a design outline to each cookie.

After the application of the design outline to the cookie, the additional coloring material is applied substantially as depicted in FIG. 6 of the drawings. Of course, the design outline and the colored fill material may be applied before or after the plurality of confectionery items are baked.

The method and apparatus contemplated by my invention thus facilitates the application of a design to a confectionery item in a highly economical and very simple manner. The method is very flexible and a number of different colors can be used in the design. The surfaces of confectionery items to which the design can be applied are relatively unlimited and include baked or unbaked surfaces as well as iced and uniced surfaces.

These and other alterations and modifications will become readily apparent to those of ordinary skill in the art without departing from the scope of this invention and applicant intends to be bound only by the appended claims.

I claim:

1. A method of decorating confectionery items such as cakes, cookies and the like comprising the steps of, applying a colored lining material to a design stamp having portions delineating a predetermined design, applying said portions of said design stamp to a confectionery item and transferring colored lining material from said portions to said confectionery item in lines delineating said predetermined design, removing said stamp from said confectionery item and leaving the said predetermined design on the surface of said confectionery item, and applying colored fill material to complete said design by coloring and decorating said design within said lines.

2. A method as in claim 1 wherein said confectionery item has an iced surface and including the step of transferring said line design to said iced surface.

3. A method as in claim 1 wherein said confectionery item has an uniced surface and including transferring said design to said uniced surface.

4. A method as in claim 1 wherein said confectionery items are made, in part, by baking and wherein the steps of applying said stamp and transferring said line design are performed prior to said baking.

5. A method as in claim 1 wherein said confectionery items are made, in part, by baking and wherein the the steps of applying said stamp and transferring said line design are performed after said baking.

6. A method as in claim 1 wherein said design stamp has a plurality of separate design members, each defining a separate independent design, and including the step of simultaneously transferring colored lining material on each of said design members to the surfaces of a plurality of confectionery items in order to simultaneously apply a delineated design to each of said items.

7. A method as in claim 1 wherein said step of applying a colored lining material to a design stamp includes impressing at least a portion of said stamp into a resilient material impregnated with said colored lining material.

* * * * *